United States Patent
Hortós Lobera et al.

(10) Patent No.: US 11,965,090 B2
(45) Date of Patent: Apr. 23, 2024

(54) POLY(LACTIC ACID) COMPOSITION COMPRISING DIPENTAERYTHRITOL

(71) Applicant: ERCROS, S.A., Barcelona (ES)

(72) Inventors: Martí Hortós Lobera, Barcelona (ES); Jordi Bou Serra, Barcelona (ES); Sebastián Espino Sosa, Barcelona (ES)

(73) Assignee: ERCROS, S.A., Barcelona (ES)

( * ) Notice: Subject to any disclaimer, the term of this patent is extended or adjusted under 35 U.S.C. 154(b) by 769 days.

(21) Appl. No.: 16/981,676

(22) PCT Filed: Mar. 20, 2019

(86) PCT No.: PCT/EP2019/056947
§ 371 (c)(1),
(2) Date: Sep. 16, 2020

(87) PCT Pub. No.: WO2019/180074
PCT Pub. Date: Sep. 26, 2019

(65) Prior Publication Data
US 2021/0363345 A1  Nov. 25, 2021

(30) Foreign Application Priority Data
Mar. 21, 2018 (EP) ..................................... 18382189

(51) Int. Cl.
| C08L 67/04 | (2006.01) |
| B29C 45/00 | (2006.01) |
| C08K 5/053 | (2006.01) |
| C08K 7/00 | (2006.01) |
| B29K 67/00 | (2006.01) |
| C08G 63/08 | (2006.01) |

(52) U.S. Cl.
CPC .......... *C08L 67/04* (2013.01); *B29C 45/0001* (2013.01); *C08K 5/053* (2013.01); *C08K 7/00* (2013.01); B29K 2067/046 (2013.01); *C08G 63/08* (2013.01)

(58) Field of Classification Search
CPC ................................. C08L 67/04; C08G 63/08
See application file for complete search history.

(56) References Cited

U.S. PATENT DOCUMENTS

2015/0353707 A1* 12/2015 Suzuki .................. C08L 101/00
524/387
2016/0177050 A1* 6/2016 Park ....................... C08G 18/64
524/424

FOREIGN PATENT DOCUMENTS

| EP | 1 674 551 | * | 6/2006 |
| EP | 2 748 256 B1 | | 6/2017 |
| EP | 3 030 616 B1 | | 9/2017 |
| EP | 3 088 467 B1 | | 4/2019 |
| JP | H11-181046 A | | 7/1999 |

OTHER PUBLICATIONS

International Search Report and Written Opinion for Interantional Application No. PCT/EP2019/056947, dated Jun. 19, 2019, with English translation, 11 pages.
Lin et al, "Polypropylene/Poly (Lactic Acid) Semibiocomposites Modified with Two Kinds of Intumescent Flame Retardants", Polymer-Plastics Technology and Engineering, XP055492224, vol. 51(10), Jul. 1, 2012, 7 pages, pp. 991-997.

* cited by examiner

*Primary Examiner* — Margaret G Moore
(74) *Attorney, Agent, or Firm* — Squire Patton Boggs (US) LLP

(57) ABSTRACT

The present invention relates to a composition comprising a polymer which comprises poly(lactic acid) and an additive which comprises dipentaerythritol, wherein the weight percentage of the polymer is from 80 to 99.5%, and the weight percentage of the additive is from 0.5 to 20%. It also relates to the use of dipentaerythritol as a nucleating agent for polymers comprising poly(lactic acid); to a process for the preparation of moulded article from the composition comprising the polymer which comprises poly(lactic acid) and an additive which comprises dipentaerythritol; and to an injection moulded article made therefrom.

2 Claims, 1 Drawing Sheet

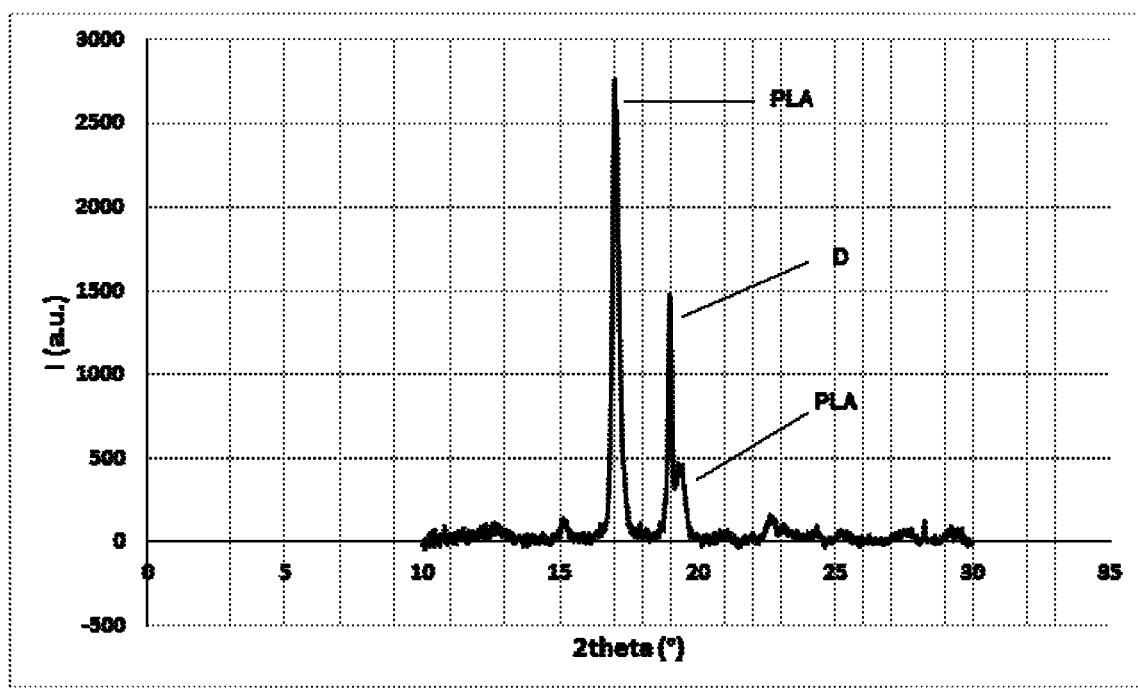

POLY(LACTIC ACID) COMPOSITION COMPRISING DIPENTAERYTHRITOL

CROSS-REFERENCE

This application is a 35 USC 371 national phase filing of PCT/EP2019/056947 filed on Mar. 20, 2019, which claims the benefit of and priority to European Patent Application No. 18382189.1 filed on Mar. 21, 2018, both applications are incorporated herein by reference in their entirety.

TECHNICAL FIELD

The invention relates to the field of poly(lactic acid) compositions and nucleating agents to improve their crystallisation properties. It also relates to an improved process for the preparation of moulded articles made from poly (lactic acid) and an additive, and to the injection moulded articles made therefrom.

BACKGROUND ART

Natural polymers, biopolymers and synthetic polymers based on renewable resources are the basis of eco-efficient plastics. These biomaterials will gradually have a place together with the petroleum-derived polymers, when not replacing them in certain applications as they become technically and cost competitive. Poly(lactide) or poly(lactic acid) (PLA) is one of the leading biopolymers in the bioplastics market due to its industrial availability and its attractive cost structure.

PLA is an aliphatic polyester that can be obtained from different natural resources such as sugar or corn, among others. Most PLA synthesis routes use lactide (cyclic lactic acid dimer) to produce high molecular weight poly(lactic acid) via ring opening polymerization (ROP) by means of Tin(II) based catalysis.

PLA is used in applications such as thermoforming, injection moulding or blow moulding and its consumption is increasing. However, the poor properties of PLA at elevated temperatures are a disadvantage that limits the use of this biopolymer in some applications. For example, poly(lactic acid) has a moderate thermal stability and at temperatures above its glass transition temperature (55-60° C.) PLA loses its rigidity drastically if it is not highly crystallized. For this reason, to manufacture a plastic article made of PLA by injection moulding with a high degree of crystallinity of the PLA, long cooling times and high mould temperatures are necessary before the plastic article can be taken out of the mould without being deformed. This results in high cycle times, i.e. the total time to manufacture an article by injection moulding as described below, and, therefore, in a decrease of productivity and an increase in production costs.

One way to improve thermal stability of poly(lactic acid) is to mix it with inorganic fillers such as talc, nanoclays, calcium carbonate, kaolin, etc. Mixtures of PLA with said loads have softening temperatures markedly higher than that of the neat polymer and can be an option for PLA-based materials with high thermal stability. In addition, there are fillers such as talc that can act as effective nucleating agents for PLA. However, the addition of these inorganic fillers may imply a decrease in the toughness or impact properties of the material.

Another nucleating agent that can promote efficiently the crystallization of poly(L-lactic acid) or PLLA is its enantiomer, the poly(D-lactic acid) or PDLA. For example, in the patent document EP2748256 PDLA was added to a PLLA resin at a mass percentage of between 1 and 10% in order to accelerate the crystallization of PLLA throughout the injection moulding process. Even though the PLA articles could be taken out of the mould at reasonable cooling times, the minimum mould temperature to prevent the PLA articles from having ejection problems was 90° C.

It is also well known in the state of the art that the nucleating agent LAK-301® (dimethyl 5-sulfoisophthalate potassium) of Takemoto Oil can efficiently accelerate the crystallization process of PLA. However, this additive is recommended to be used with a mould temperature of 110° C. in injection moulding applications.

Pentaerythritol was disclosed to act as a nucleating agent for poly(hydroxyalkanoate) (PHA) polymers in the patent application EP3088467. However, in the same document it was disclosed that dipentaerythritol did not have the effect of crystallizing the poly(hydroxyalkanoate).

Lin Z. et al (Polymer-Plastics Technology and Engineering 2012, 51, 991-7) have reported Polypropylene/Poly (Lactic Acid) semibiocomposites modified with two kinds of Intumescent Flame Retardants (IFR) which contain dipentaerythritol. This document does not disclose crystalline PLA or the nucleating effect of dipentaerythritol on PLA. Besides, the content of PLA in the compositions disclosed by Lin Z. et al is at most 15% by weight with respect to the total composition.

Despite several efforts have been made, there is still a need to find more additives capable to induce the crystallization process of PLA and increase its crystallization rate, without having a negative impact on final product properties. That is, obtaining an article with highly crystallized PLA and with improved thermal stability while reducing the cycle time and the transformation temperature of the plastic material.

SUMMARY OF INVENTION

The inventors have found that dipentaerythritol can be used as a nucleating agent for poly(lactic acid) (PLA) and improves its overall crystallization rate, when compared to other nucleating agents such as talc as illustrated in the examples.

Furthermore, a composition containing poly(lactic acid), in particular, as a polymeric matrix, and an additive containing dipentaerythritol or a mixture of pentaerythritol and its oligomers specifically containing dipentaerythritol (herein also mentioned as MPO) as described herein allows reducing the cycle time and the cooling temperature in the mould during the transformation of the composition into an article by injection moulding. This results in a PLA composition that provides productivity advantages.

In addition, as shown in Example 7, the mechanical properties that characterize PLA compositions and make them attractive for its industrial use are not affected by the addition of the additive comprising dipentaerythritol.

Therefore a first aspect of the invention provides a composition comprising:
  a) a polymer which comprises poly(lactic acid), and
  b) an additive which comprises dipentaerythritol,
  wherein:
  the weight percentage of poly(lactic acid) in the polymer is from 60 to 100%,
  the weight percentage of the polymer is from 80 to 99.5%, and
  the weight percentage of the additive is from 0.5 to 20%, wherein the percentages are expressed with respect to the total composition weight, provided that the sum of the amounts of the components is equal to 100%.

Another aspect of the invention relates to a process for the preparation of the composition as defined above, comprising blending a polymer comprising poly(lactic acid) and an additive comprising dipentaerythritol, wherein the polymer is in a fluid state.

Another aspect of the invention relates to a composition comprising:
a) a polymer which comprises poly(lactic acid), and
b) an additive which comprises dipentaerythritol,
wherein:
the weight percentage of poly(lactic acid) in the polymer is from 60 to 100%,
the weight percentage of the polymer is from 80 to 99.5%, and
the weight percentage of the additive is from 0.5 to 20%,
wherein the percentages are expressed with respect to the total composition weight, provided that the sum of the amounts of the components is equal to 100%; wherein the composition is obtainable by a process comprising blending the polymer and the additive, wherein the polymer is in a fluid state.

A further aspect of the invention is the use of dipentaerythritol as a nucleating agent for polymers comprising PLA.

Another aspect of the invention is a process for preparation of a moulded article, comprising the steps of:
a) heating the composition as defined above at a temperature from 180 to 220° C.;
b) adding the composition obtained in step a) to a mould;
c) cooling the composition inside the mould; and
d) taking the moulded article out of the mould;
wherein steps a) and b) are carried out in any order.

Finally, another aspect of the invention is the injection moulded article made from the composition as defined above.

BRIEF DESCRIPTION OF DRAWINGS

FIG. 1. shows the X-ray diffractogram (XRPD) of composition comprising PLA and 5% of dipentaerythritol (D) by weight. The spectrum expresses intensity (I; counts) versus degrees 2 theta)(° (Example 2).

DETAILED DESCRIPTION OF THE INVENTION

All terms as used herein in this application, unless otherwise stated, shall be understood in their ordinary meaning as known in the art. Other more specific definitions for certain terms as used in the present application are as set forth below and are intended to apply uniformly throughout the specification and claims unless an otherwise expressly set out definition provides a broader definition.

For the purposes of the present invention, any ranges given include both the lower and the upper end-points of the range. Ranges given, such as temperatures, times, ratios of compositions and the like, should be considered approximate, unless specifically stated.

As commented above, an object of the present invention is to provide a composition comprising a polymer which comprises poly(lactic acid) and an additive which comprises a nucleating agent that can be taken out of mould with cycle times and transformation temperatures industrially acceptable in applications such as thermoforming and injection moulding.

As illustrated by the examples below, the present inventors have found that a poly(lactic acid) composition with at least 0.5% or about 0.5% by weight of dipentaerythritol over the total has a significantly higher PLA overall crystallization rate than a PLA composition comprising talc, and similar or even higher PLA overall crystallization rate than a PLA composition comprising PDLA as a nucleating agent (see Example 1). For example, in Table 1 is shown a PLA composition comprising 1% by weight of dipentaerythritol having a peak crystallization temperature of 123.8° C. and a degree of crystallinity of 47.1% while the same PLA in a composition comprising 5% of talc has a peak crystallization temperature of 113.4° C. and a degree of crystallinity of 36.9%. Finally, the same PLA in a composition comprising 5% of PDLA performed a peak crystallization temperature of 124.1° C. and a degree of crystallinity of 39.7%.

Additionally, carrying out the crystallization under isothermal conditions, as an example at 120° C., the crystallization half-time of the PLA composition comprising 1% by weight of dipentaerythritol is about half that of the PLA composition comprising 5% by weight of talc or half that of the PLA composition comprising 5% by weight of PDLA. Therefore, dipentaerythritol is a more effective nucleating agent than talc and PDLA, even at lower concentrations, and can be an alternative to produce articles based on highly crystallized PLA with industrial applicability.

In the present invention, the terms "poly(lactic acid)", "poly(lactide)" and "PLA" are interchangeable. As mentioned above, PLA is a generic name used for polymers based on the lactic acid or on the lactide, which is a cyclic dimer of lactic acid, as monomers. Lactic acid exists in two forms (two enantiomers) that only differ, in terms of physical properties, in the direction in which the polarized light is deflected. The dimer L-lactide, or (S,S)-lactide, is obtained from two molecules of L-lactic acid, or S-Lactic acid; and the D-lactide, or (R,R)-lactide, is obtained from two molecules of D-lactic acid, or R-lactic acid. The combination of one molecule of L-lactic acid and one of D-lactic acid results in the cyclic dimer meso-lactide (R,S)-lactide, which has a lower melting temperature than L-lactide or D-lactide. Consequently, both enantiomers of lactic acid can be found as monomers in PLA independently of whether PLA was obtained from lactic acid directly or from its dimer, the lactide; and the quantity of each enantiomer in the PLA will depend on the purity of the starting lactic acid or lactide in terms of the content of enantiomers. If the major constituent of PLA is the L-lactic enantiomer then it is known as poly(L-lactic acid) or poly(L-lactide) and the purity is expressed by the percentage of the enantiomer L content over the total. Conversely, when the major constituent of PLA is the D-lactic enantiomer then it is known as poly(D-lactic acid) or poly(D-lactide) and the purity is expressed by the percentage of the enantiomer D content over the total. The term "purity" as used herein applied to PLA refers to the fraction of L-lactic acid monomer in a PLA rich in L-lactic monomer, or PLLA; and also to the fraction of D-lactic acid monomer in a PLA rich in D-lactic monomer, or PDLA; expressed as a percentage. The purity of PLA clearly determines its properties. Depending on the purity, PLA can be amorphous or semi-crystalline. The higher the purity, the more and the faster the polymer crystallizes. When poly(L-lactic acid) has a purity lower than 88% the polymer cannot crystallize and is amorphous; and, conversely, when its purity is higher than 88%, the PLA can crystallize and is semi-crystalline. Poly(L-lactic acid) is also known as PLLA and poly(D-lactic acid) as PDLA.

In a particular embodiment of the first aspect, optionally in combination with any embodiments above or below, the poly(lactic acid) comprised in the polymer is selected from poly(L-lactic acid), poly(D-lactic acid), poly(D,L-lactic acid), and combinations thereof, more particularly, the poly (lactic acid) is PLLA. In another particular embodiment, the poly(lactic acid) comprised in the polymer is selected from poly(L-lactic acid), poly(D-lactic acid), and combinations thereof.

When characterizing polymers, it is important to consider the polydispersity index (PDI) as well as the molecular weight. Polymers can be characterized by a variety of definitions for molecular weight including the number average molecular weight (Mn), the weight average molecular weight (Mw), the size average molecular weight (Mz), or the viscosity molecular weight (Mv). Gel Permeation Chromatography (GPC) allows for the determination of PDI as well as Mv and based on other data, the Mn, Mw, and Mz can be determined.

The molecular weight in number (Mn) of the poly(lactic acid) (PLA) was measured by the GPC technique based in standard poly(methyl methacrylate) patterns, using hexafluoro-2-propanol as solvent at room temperature.

GPC is a type of size exclusion chromatography (SEC), that separates analytes based on their size or hydrodynamic volume (radius of gyration). Separation occurs via the use of porous beads packed in a column. The smaller analytes can enter the pores more easily and therefore spend more time in these pores, increasing their retention time. These smaller molecules spend more time in the column and therefore will elute last. Conversely, larger analytes spend little, if any time, in the pores and are eluted quickly. All columns have a range of molecular weights that can be separated. If an analyte is either too large or too small, it will be either not retained or completely retained, respectively. Analytes that are not retained are eluted with the free volume outside of the particles ($V_o$), while analytes that are completely retained are eluted with volume of solvent held in the pores ($V_i$). The total volume can be considered by the following equation, where Vg is the volume of the polymer gel and $V_t$ is the total volume: $V_t = V_g + V_i + V_o$.

GPC measures the molecular volume and shape function as defined by the intrinsic viscosity. If comparable standards are used, this relative data can be used to determine molecular weights within ±5% accuracy.

In another embodiment of the first aspect, optionally in combination with any embodiments above or below, the molecular weight number (Mn) of the poly(lactic acid) is from 40 to 400 kg/mol in particular as measured by the GPC technique. More particularly, in a further embodiment, the molecular weight of the poly(lactic acid) is from 70 to 300 kg/mol, more particularly from 100 to 200 kg/mol, measured by the GPC technique.

Poly(lactic acid) (PLA) as used herein also refers to a mixture in any proportion of polymers (L-lactic acid) (PLLA), and poly(D-lactic acid) (PDLA) each having an purity of at least 95%. The term PLLA also refers to a mixture of PLLA molecules having different molecular weights with a polydispersity (PD) of between 1.5 and 3. The term PDLA also refers to a mixture of PDLA molecules having different molecular weights with a polydispersity (PD) between 1.5 and 3. In a particular embodiment of the invention, optionally in combination with any embodiments above or below, the purity of the PLA comprised in the polymer of the composition of the invention is equal or higher than 95%, or comprised from 95 to 100%. Particularly, the purity of PLA is of about 95%, about 96%, about 97%, about 98%, about 99% or 100%, which can be measured by polarimetry.

The term "about" or "around" as used herein refers to a range of values±10% of a specified value. For example, the expression "about 10" or "around 10" includes±10% of 10, i.e. from 9 to 11.

As mentioned above, the composition of the invention comprises a polymer which comprises poly(lactic acid). The polymer comprising the poly(lactic acid) may be also referred to as polymer matrix and is the main component of the composition, being the weight percentage of the polymer or polymer matrix in the composition from 80 to 99.5%. For the purposes of the invention, the terms "polymer" or "polymer matrix" as used herein are defined as any polymer or any blend of polymers which are the essential and the major part of the compositions herein mentioned. As it is evident for a skilled in the art polymer additives (e.g. plasticizers), these kind of additives, although polymers, are not to be considered herein to form part of the polymer or polymer matrix as the main or essential part of the compositions.

In one embodiment of the invention, optionally in combination with any embodiments above or below, the composition of the invention comprises a polymer or mixture of polymers in an amount from 80 to 99.5% by weight with respect to the total composition weight. More particularly, the composition comprises a polymer or mixture of polymers in an amount from 85 to 99.5%, even more particularly from 95 to 99%, by weight with respect to the total composition weight. In another embodiment, the amount of polymer or mixture of polymers is of about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% by weight with respect to the total composition weight.

The term "percentage (%) by weight" refers to the amount of a component in weight in relation to the total composition weight, or total polymer or additive comprised in the composition of the invention.

As mentioned above, the composition of the polymer or polymer matrix comprises poly(lactic acid) in an amount from 60 to 100% by weight with respect to the total weight of the polymer or polymer matrix.

When the amount of poly(lactic acid) is 100% by weight with respect to the total weight of the polymer or polymer matrix, the polymer or polymer matrix consists of poly (lactic acid). Thus, in another embodiment of the invention, optionally in combination with any embodiments above or below, the composition of the invention comprises a polymer which consists of poly(lactic acid). More particularly, the polymer consists of poly(lactic acid) in an amount from 80 to 99.5% by weight with respect to the total composition weight. More particularly, the polymer which consists of poly(lactic acid) is present in the composition in an amount from 90 to 99.5%, even more particularly from 97 to 99%, by weight with respect to the total composition weight. In another embodiment, the polymer which consists of poly (lactic acid) is of about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% by weight with respect to the total composition weight.

The polymer or polymer matrix may comprise one or more further polymers apart from poly(lactic acid). Thus, in one embodiment of the invention, optionally in combination with any embodiments above or below, the polymer or polymer matrix comprises one or more further polymers apart from poly(lactic acid), wherein the weight percentage of each of the one or more further polymers is from 0 to 40%, more particularly from 20 to 40%, or from 30 to 40%, with respect to the total polymer or polymer matrix weight.

In another embodiment of the invention, optionally in combination with any embodiments above or below, the weight percentage of poly(lactic acid) in the polymer or polymer matrix is from 70 to 100%, from 75 to 100%, from 80 to 100%, from 85 to 100%, from 90 to 100%, or from 95 to 100%. In another embodiment, the amount of poly(lactic acid) in the polymer is of about 60%, about 65%, about 70%, about 75%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% by weight with respect to the total polymer or polymer matrix weight.

The inventors have also found that crystallization is also improved using the additive of the invention when the polymer used to prepare the composition comprises PLA and other polymers such as polycarbonate (PC). As an example, polycarbonates can be used in engineering since they are strong, tough materials, and some grades are optically transparent. A typical PC used in the state of the art of thermoplastic moulding that can be used in the invention is the PC Makrolon® 2207, which has a melt temperature from 280 to 320° C., a glass transition temperature of 145° C., and an MVR (300° C./1.2 kg) of 35 cm³/10 min. Alternative thermoplastics that may also be used in combination with PLA include, without limitation, poly(acrylonitrile butadiene styrene) (ABS), poly(butylene succinate) (PBS), or poly(hydroxyalcanoates) (PHA).

Therefore, in another embodiment of the first aspect of the invention, optionally in combination with any embodiments above or below, the polymer of the invention further comprises another thermoplastic. More particularly, the thermoplastic further comprised in the composition is selected from the group consisting of polycarbonate (PC), poly(acrylonitrile butadiene styrene) (ABS), poly(butylene succinate) (PBS) and poly(hydroxyalcanoates) (PHA). In another embodiment, optionally in combination with any embodiments above or below, the polymer of the invention further comprises PC.

Particularly, the polymer comprises from 60 to 70% of PLA and from 40 to 30% of PC. More particularly, the polymer consists of from 60 to 70% of PLA and from 40 to 30% of PC. In a further embodiment, the polymer of the invention comprises about 60%, about 61%, about 62%, about 63%, about 64%, about 65%, about 66%, about 67%, about 68%, about 69% or about 70% of PLA by weight of the polymer comprised in the composition.

In another further embodiment, the polymer of the invention comprises about 30%, about 31%, about 32%, about 33%, about 34%, about 35%, about 36%, about 37%, about 38%, about 39% or about 40% of PC by weight of the polymer comprised in the composition.

In another embodiment of the invention, optionally in combination with any embodiments above or below, the polymer or polymer matrix consists of poly(lactic acid) and another thermoplastic selected from the group consisting of polycarbonate (PC), poly(acrylonitrile butadiene styrene) (ABS), poly(butylene succinate) (PBS) and poly(hydroxyalcanoates) (PHAs).

As described below, the inventors have provided data confirming that an additive comprising dipentaerythritol is useful to induce PLA crystallization.

Dipentaerythritol is a polyhydric alcohol represented by the following chemical formula (I).

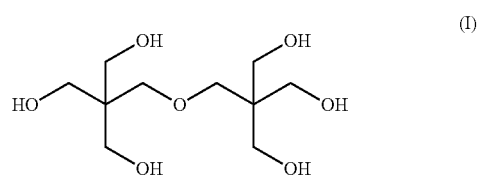 [SMILES: OCC(CO)(CO)COCC(CO)(CO)CO]

In its solid state, it is presented as a crystalline white powder. It has a melting point of 218.6° C. Dipentaerythritol is commercially available. It may be obtained as a byproduct in the synthesis of pentaerythritol by the reaction between acetaldehyde and formaldehyde with a basic catalyst.

Taking into account the teachings disclosed in EP3088467, dipentaerythritol does not have the capacity to act as a nucleating agent of aliphatic polyesters, such as PHA. However, according to the results obtained by the present inventors, dipentaerythritol and mixtures comprising it can be used as an additive having nucleating activity, as shown in Examples 1-7.

As shown in Examples 2 to 4, the amount of additive of the composition can be used at a broad percentage by weight of the final composition, having positive results regarding the crystallization rate of PLA. As mentioned above, the composition of the invention comprises an additive, which comprises dipentaerythritol, wherein the weight percentage of the additive is from 0.5 to 20% by weight with respect to the total composition weight. In one embodiment of the invention, optionally in combination with any embodiments above or below, the composition of the invention comprises an additive, which comprises dipentaerythritol, wherein the additive is present in an amount from 5 to 20%, even more particularly from 5 to 10, by weight with respect to the total composition weight. In a further embodiment, the composition of the invention comprises an additive in an amount of about 5%, about 6%, about 7%, about 8%, about 9%, about 10%, about 11%, about 12%, about 13%, about 14%, about 15%, about 16%, about 17%, about 18%, about 19%, or about 20% by weight with respect to the total composition weight.

In one embodiment of the invention, optionally in combination with any embodiments above or below, the composition of the invention comprises an additive which comprises dipentaerythritol wherein the weight percentage of the dipentaerythritol is from 0.5 to 20%. In a particular embodiment of the invention, optionally in combination with any embodiments above or below, the composition of the invention comprises an additive which comprises dipentaerythritol in an amount from 0.5 to 15%, even more particularly from 1 to 5%, by weight with respect to the total composition weight. In a further embodiment, the composition of the invention comprises an additive which comprises dipentaerythritol in an amount of about 1%, about 2%, about 3%, about 4%, about 5%, about 6%, about 7%, about 8%, about 9%, about 10%, about 11%, about 12%, about 13%, about 14% or about 15% by weight with respect to the total composition weight.

In another embodiment of the invention, optionally in combination with any embodiments above or below, the composition of the invention comprises an additive which consists of dipentaerythritol. More particularly, the additive that consists of dipentaerythritol is present in the composition in an amount from 0.5 to 20% by weight with respect to the total composition weight. More particularly, the additive which consists of dipentaerythritol is present in the composition in an amount from 0.5 to 15%, even more particularly from 1 to 5%, by weight with respect to the total composition weight. In another embodiment, the additive which consists of dipentaerythritol is present in the composition in an amount of about 1%, about 2%, about 3%, about 4%, about 5%, about 6%, about 7%, about 8%, about 9%, about 10%, about 11%, about 12%, about 13%, about 14% or about 15% by weight with respect to the total composition weight.

In another embodiment of the invention, optionally in combination with any embodiments above or below, the weight ratio of poly(lactic acid) and dipentaerythritol is from 30:1 to 199:1, more particularly from 44:1 to 100:1.

Particle size, as referred herein, was calculated using Light Scattering (LS) technique.

As shown in Example 2, different particle sizes of dipentaerythritol can be used to prepare the composition of the invention. Therefore, in a particular embodiment of the first aspect, optionally in combination with any embodiments above or below, the additive, particularly consisting of dipentaerythritol, is present in the composition in the form of particles, more particularly having a mean particle size from 5 to 90 μm. Furthermore, in a more particular embodiment the size of the particles is from 5 to 20 μm, from 21 to 50 μm, or from 51 to 90 μm. More particularly, the size of the particles is from 6 to 10 μm, from 21 to 35 μm, or from 60 to 80 μm. Additionally, in another embodiment, the size of the particles is about 7, about 24 or about 74 μm.

The present inventors have found that the advantages described above for the additive consisting of dipentaerythritol are also obtainable by using a mixture of pentaerythritol and its oligomers specifically containing dipentaerythritol (MPO) (See Example 4). As described below, using an additive comprising the mixture MPO comprising 47% of dipentaerythritol by weight of the additive, 12.5% of pentaerythritol by weight of the additive, 32% of tripentaerythritol by weight of the additive, and 8.3% by weight of the additive of a fraction containing tetra-penta- and hexapentaerythritol, one can obtain even a higher PLA overall crystallization rate than using dipentaerythritol alone (See Table 4). The peak crystallization temperature and the crystal fraction of PLA were higher using the MPO as the additive of the invention, compared to the composition that consisted of PLA and dipentaerythritol; and the improvement in the measured parameters is higher at high additive contents.

Penta-, dipenta-, tripenta-, tetrapenta-, pentapenta-, and hexapentaerythritol are organic compounds, also known as polyhydric alcohols. The mixture of these components is a white powder, having a melting temperature from 200 to 220° C. depending on the final composition of the mixture.

Pentaerythritol is represented by the following chemical formula (II).

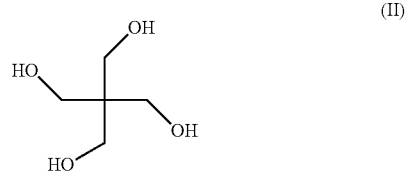

Tripentaerythritol is represented by the following chemical formula (III).

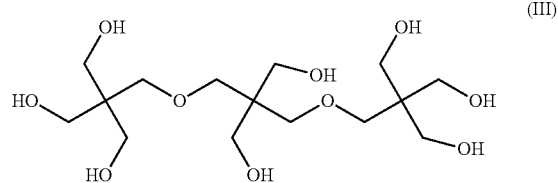 [SMILES: OCC(CO)(CO)COCC(CO)(CO)COCC(CO)(CO)CO]

Tetrapentaerythritol is represented by the following chemical formula (IV).

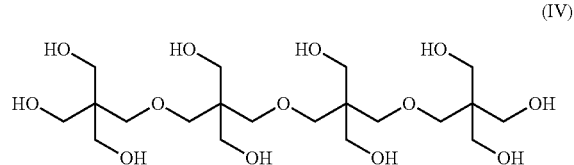 [SMILES: OCC(CO)(CO)COCC(CO)(CO)COCC(CO)(CO)COCC(CO)(CO)CO]

Therefore, in one embodiment of the invention, optionally in combination with any embodiments above or below, the additive of the composition further comprises one or more compounds selected from the group consisting of pentaerythritol tripentaerythritol, tetrapentaerythritol, pentapentaerythritol, and hexapentaerythritol.

Furthermore, in another particular embodiment, optionally in combination with any embodiments above or below, the additive comprises pentaerythritol, dipentaerythritol, tripentaerythritol, tetrapentaerythritol, pentapentaerythritol, and hexapentaerythritol, wherein the weight percentage of dipentaerythritol is from 40 to 50%, the weight percentage of pentaerythritol is from 1 to 20%, the weight percentage of tripentaerythritol is from 30 to 40%, and the weight percentage of the fraction containing tetra-, penta- and hexapentaerythritol, wherein the amount of penta- and hexapentaerythritol is equal or lower than 50%, is from 5 to 20%, wherein the % are expressed with respect to the total additive weight, provided that the sum of the amounts of the components of the additive is equal to 100%.

In another particular embodiment, optionally in combination with any embodiments above or below, the additive consists of dipentaerythritol and one or more compounds selected from the group consisting of pentaerythritol, tripentaerythritol, tetrapentaerythritol, pentapentaerythritol and hexapentaerythritol.

In another particular embodiment, optionally in combination with any embodiments above or below, the additive consists of pentaerythritol, dipentaerythritol, tripentaerythritol, tetrapentaerythritol, pentapentaerythritol, and hexapentaerythritol, wherein the weight percentage of dipentaerythritol is from 40 to 50%, the weight percentage of pentaerythritol is from 1 to 20%, the weight percentage of tripentaerythritol is from 30 to 40%, and the weight percentage of the fraction containing tetra, penta- and hexapentaerythritol, wherein the amount of penta- and hexapentaerythritol is equal or lower than 50%, is from 5 to 20%, wherein the % are expressed with respect to the total additive weight, provided that the sum of the amounts of the components of the additive is equal to 100%. More particularly, the additive of the later embodiment is present in the composition in an amount from 0.5 to 20% by weight with respect to the total composition weight. Furthermore, the additive of the later embodiment is present in the composition in an amount from 0.5 to 15%, even more particularly from 1 to 5%, by weight with respect to the total composition weight. In an even further embodiment, the composition of the invention comprises the additive of the later embodiment in an amount of about 1%, about 2%, about 3%, about 4%, about 5%, about 6%, about 7%, about 8%, about 9%, about 10%, about 11%, about 12%, about 13%, about 14% or about 15% by weight with respect to the total composition weight.

In another particular embodiment, optionally in combination with any embodiments above or below, the additive, particularly consisting of pentaerythritol, dipentaerythritol, tripentaerythritol, tetrapentaerythritol, pentapentaerythritol, and hexapentaerythritol, as defined in the later embodiment, is present in the composition in the form of particles, more particularly having a mean particle size from 1 to 80 µm. Furthermore, the size of the particles is from 5 to 60 µm, particularly from 10 to 40 µm, or even more particularly is from 150 to 300 µm. In another embodiment, the size of the particles of the additive is about 18 µm.

The crystallinity and the crystallization rate of the PLA can be determined by "Differential Scanning calorimetry" (DSC). In the DSC diagram (thermogram), the amorphous PLA will show only the glass transition temperature, 55-60° C., while the semi-crystalline PLA may also show melting and crystallization peaks. For the determination of the crystallinity of PLA-based materials it is necessary to quantify the energy per unit mass of PLA of the melting peak and subtract the energy per unit mass of PLA generated during the cold crystallization process (if it appears). The position of the melting peak is determined by the purity of the poly(lactic acid): increasing the purity, the melting peak moves to higher temperatures, until reaching a maximum around 180° C. for the case of both homopolymers, PLLA and PDLA.

To evaluate overall crystallization rate of each PLA composition, a dynamic test can be carried out in the DSC, that is, applying two controlled cooling ramps (10 and 25° C./min) for each sample, evaluating the calorimetric parameters determined in the different sweeps. In order to evaluate the nucleation efficiency, degree of crystallinity ($X_c$), crystallization temperature ($T_a$) and crystallization peak width ($\Delta T_c$) can be determined from the different cooling sweeps.

Degree of crystallinity or crystal fraction, $X_c$: Describes in a quantitative way the crystalline fraction, that is, the mass fraction as percentage of PLA that is in the form of crystals. As mentioned, this parameter can be determined by DSC. In this context, this value reflects the crystalline fraction generated in the controlled cooling process. The value 93.6 J/g was taken as "ideal fusion enthalpy" (ideal enthalpy of a 100% crystalline sample). To evaluate the degree of crystallinity of the PLA in each composition, a mass correction considering the really existing PLA fraction was made. The reported $X_c$ corresponds to the crystallinity developed in the PLA matrix.

Crystallization temperature, $T_c$: This parameter is useful to measure the nucleation efficiency of an additive. At the same conditions, if the PLA matrix is able to crystallize during the cooling ramp "before", i.e. at higher values of Tc, then the nucleating agent is more effective than the ones that give lower crystallization temperatures Tc. A crystallization process that starts at higher temperatures could lead to a decrease in cycle time while manufacturing plastic articles in process like injection moulding.

Crystallization peak width, $\Delta T_c$. This parameter reflects the intrinsic crystallization rate for a given controlled cooling ramp. Comparing compositions at the same crystalline fraction of PLA, the composition having a narrower crystallization peak will have a higher crystallization rate. To evaluate the crystallization process of a PLA composition, an isothermal test can also be carried out in the DSC to determine the crystallization half-time, defined as the time required to attain half of the final crystallinity of PLA.

In a particular embodiment of the first aspect of the invention, optionally in combination with any embodiments above or below, the crystallization temperature of the PLA composition is 105° C. or higher measured by DSC when applying a controlled cooling ramp of 10° C./min. More particularly, the crystallization temperature of the composition is 109° C. or higher measured by DSC when applying a controlled cooling ramp of 10° C./min. In another embodiment, the crystallization temperature of the composition is from 105 to 130° C. or higher measured by DSC when applying a controlled cooling ramp of 10° C./min.

Alternatively, the crystallization temperature of the composition can be measured by DSC applying a controlled cooling ramp of 25° C./min. Thus, in another particular embodiment of the first aspect of the invention, optionally in combination with any embodiments above or below, the crystallization temperature of the composition is 99° C. or higher measured by DSC when applying a controlled cooling ramp of 25° C./min. More particularly, the crystallization temperature of the composition is 101° C. or higher measured by DSC when applying a controlled cooling ramp of 25° C./min. In another embodiment, the crystallization temperature of the composition is from 100 to 120° C. or higher measured by DSC when applying a controlled cooling ramp of 25° C./min.

In addition, the composition of the invention may be further characterized by an X-ray diffractogram as shown in FIG. 1. Thus, in another embodiment, optionally in combination with any embodiments above or below, the invention relates to a composition comprising a polymer which comprises poly(lactic acid) and an additive which comprises dipentaerythritol, wherein the weight percentage of the polymer is from 80 to 99.5%, and the weight percentage of the additive is from 0.5 to 20%; characterized by having an X-ray diffractogram as in FIG. 1. More particularly, the composition of the invention is characterized by having an X-ray diffractogram that comprises characteristic peaks at 16.99, 19.00, and 19.40±0.01 degrees 2 theta measured in an X-ray diffractometer with Cu Kα radiation (1.5418 Å).

Furthermore, in another embodiment of the first aspect of the invention, optionally in combination with any embodiments above or below, the degree of crystallinity (Xc) of the composition is from 35 to 55 measured by DSC when applying a controlled cooling ramp of 10° C./min.

Optionally, the degree of crystallinity of the composition can be measured by DSC applying a controlled cooling ramp of 25° C./min. Therefore, in another embodiment of the first aspect of the invention, optionally in combination with any embodiments above or below, the degree of crystallinity (Xc) of the composition is from 21 to 45 measured by DSC when applying a controlled cooling ramp of 25° C./min.

In an embodiment, optionally in combination with any embodiments above or below, the invention relates to a composition consisting of a polymer which comprises poly (lactic acid) (in an amount from 60 to 100% by weight of the polymer or polymer matrix) and an additive which comprises dipentaerythritol, wherein the weight percentage of the polymer is from 80 to 99.95%, more particularly, the invention relates to a composition consisting of a polymer which consists of poly(lactic acid) and an additive which consists of dipentaerythritol, wherein the weight percentage of the polymer is from 80 to 99.95%.

Alternatively, as shown in Example 3, other components can be added to the composition of the invention having different impacts on the crystallization improvement performed by dipentaerythritol. For the purposes of the invention, these components can also be considered as additives. These components or additives may be in some cases of polymeric nature. However, these polymer components or polymer additives, which are typically used as modifiers of properties of the polymer matrix such as impact resistance, melt strength, thermal resistance, among others, are not considered herein as a part of the polymer matrix and therefore are not to be considered within the definition of polymer or polymer matrix used herein.

The addition of one or more and the concentration of it will be due to the suitability of the component's impact in the final properties of the composition. Thus, in order to produce a material without problems in taking articles out the mould and exceeding technical requirements of thermal stability and impact properties, it will be essential to select and balance the components within the composition. Therefore, in another embodiment of the invention, optionally in combination with any embodiments above or below, the composition further comprises one or more compounds or additives selected from the group consisting of fillers, plasticizers, impact modifiers, accelerating agents, nucleating agents, compatibilizers, and combinations thereof.

Examples of fillers include but are not limited to: talc, nanoclays, calcium carbonate, wood flour, and saw dust. Examples of plasticizers include but are not limited to: bis (2-ethylhexyl) adipate (DOA), acetyl tributyl citrate (ATBC), modified oligomers of PLA, such as Glyplast® OLA 8 (Condensia), and low molecular weight polymers such as, for example, polyethylene glycol (PEG). Examples of accelerating agents include but are not limited to: poly [(R)-3-hydroxybutyrate] (PHB), poly(ε-caprolactone) (PCL), and polyglycolide (PGA). Examples of impact modifiers are include but are not limited to Biostrength 150® (Arkema), which is an acrylic copolymer with styrene and butadiene groups, modified oligomers of PLA such as Glyplast® OLA 2 (Condensia), Paraloid® BPM-515 (Dow Chemical), which is an acrylic impact modifier, and copolymers of ethylene such as Biomax® Strong (DuPont). Examples of nucleating agents for PLLA (poly(L-lactic acid)) include but are not limited to talc, calcium carbonate, kaolin, PDLA (poly(D-lactic acid)), modified clays, ethylene bis(stearamide) and aromatic sulfonates such as LAK-301®. Examples of compatibilizers include but are not limited to Joncryl® ADR-4300F, which is an oligomer of styrene, acrylates and acrylates with epoxy groups.

In another particular embodiment, optionally in combination with any embodiments above or below, the one or more compounds of the later embodiment are selected from the group consisting of fillers such as talc, nanoclays, calcium carbonate, wood flour, and saw dust; plasticizers such as bis (2-ethylhexyl) adipate (DOA), acetyl tributyl citrate (ATBC), modified oligomers of PLA, and low molecular weight polymers such as polyethylene glycol (PEG); accelerating agents such as poly[(R)-3-hydroxybutyrate] (PHB), poly(ε-caprolactone) (PCL), and polyglycolide (PGA); impact modifiers such as acrylic copolymer with styrene and butadiene groups, modified oligomers of PLA, acrylic impact modifier, and copolymers of ethylene; nucleating agents for PLLA such as talc, calcium carbonate, kaolin, PDLA (poly(D-lactic acid)), modified clays, ethylene bis(stearamide) and aromatic sulfonates; compatibilizers such as oligomers of styrene, acrylates and acrylates with epoxy groups; and combinations thereof.

In another particular embodiment, optionally in combination with any embodiments above or below, the one or more compounds of the later embodiment is/are present in the composition in an amount from 1 to 19.5% by weight with respect to the total composition weight. More particularly, the further components comprised in the composition are present in an amount from 2 to 10%, even more particularly from 3 to 7, by weight with respect to the total composition weight. In another embodiment, the further components comprised in the composition are present in an amount of about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, or about 19% by weight with respect to the total composition weight.

It also forms part of the invention a process for the preparation of the composition as defined above, comprising blending a polymer comprising poly(lactic acid) and an additive comprising dipentaerythritol, wherein the polymer is in a fluid state, more particularly in a liquid state.

The term 'fluid' refers to a substance tending to flow or conform to the outline of its container, preferably being a liquid. This state can be obtained e.g. by dissolution of the polymer in a solvent or by melt blending it as explained below.

There are routine techniques to blend poly(lactic acid) and an additive comprising dipentaerythritol wherein the polymer is in a fluid state. An example of that includes the use of solvents such as dichloromethane, chloroform or dioxane to dissolve the PLA comprising-polymer and further blending it with the additive before finally eliminating the solvent by vaporization or by any other means as it is well known in this art. Alternatively, a person skilled in the art could blend the polymer comprising PLA and the additive comprising dipentaerythritol by melt blending the mixture at a temperature ranging from the melting point of PLA to the melting point of dipentaerythritol.

When the composition further comprises one or more compounds selected from the group consisting of fillers, plasticizers, impact modifiers, accelerating agents, nucleating agents and combinations thereof, then the process for the preparation of the composition comprises blending a polymer comprising poly(lactic acid), an additive comprising dipentaerythritol, and one or more compounds as defined above, wherein the polymer is in a fluid state, more particularly in a liquid state.

Those skilled in the art would know how to adjust the conditions of the above process.

Thus, in one particular embodiment, optionally in combination with any embodiments above or below, the step of blending the polymer and the additive, wherein the polymer is in a fluid state comprises melt blending the polymer and the additive at a temperature from 180° C. to 220° C. More particularly, the melt blending temperature is from 185 to 210° C. In any case, this temperature is limited to be below the melting temperature of the nucleating agent.

In another embodiment of the invention, optionally in combination with any embodiments above or below, the process is performed under agitation, for example for 5 to 15 minutes at 40-200 rpm; particularly, for 8 minutes at 60 rpm in an internal mixer of the type commonly used at laboratory scale for the dispersion of additives in thermoplastics by melt blending, as it is well known to those skilled in the art of thermoplastic compounding. The melt blending can also take place in a continuous co-rotating twin-screw extruder. The mixing conditions should be adapted from one mixer to another.

Alternatively, as stated before, the composition of the invention is obtainable by dissolving the polymer comprising PLA with a solvent. Thus, in another particular embodiment, optionally in combination with any embodiments above or below, the step of blending the polymer and the additive, wherein the polymer is in a fluid state comprises the step of blending the polymer and the additive, wherein the polymer is in a fluid state comprises dissolving the polymer in the presence of the additive.

More particularly, the step of dissolving the polymer is carried out in a solvent selected from the group consisting of dichloromethane, chloroform, dioxane, and mixtures thereof.

The composition of the invention may be characterized by its process of preparation. Thus, it also forms part of the invention a composition comprising a polymer which comprises poly(lactic acid) and an additive which comprises dipentaerythritol as defined above; wherein the composition is obtainable by a process comprising blending the polymer and the additive, wherein the polymer is in a fluid state.

The expression composition "obtainable by the process" of the invention is used herein to define the composition by its preparation process and refers to the composition that can be obtained through the preparation process which comprises the step of blending the polymer and the additive, wherein the polymer is in a fluid state, as previously defined. For the purposes of the invention, the expressions "obtainable", "obtained" and similar equivalent expressions are used interchangeably and, in any case, the expression "obtainable" encompasses the expression "obtained".

The particular embodiments mentioned above in connection with the process for the preparation of the composition and with the composition itself also apply to the product-by-process embodiments.

Furthermore, in another embodiment of the first aspect of the invention, optionally in combination with any embodiments above or below, the composition of the invention is different from a simple mixture of the polymer and the additive.

Crystallization consists of two processes: the nucleation and the growth of the crystal. By introducing nucleating agents, the nucleation rate is favoured (decrease in the induction time of stable nuclei) while with the use of accelerating agents the crystalline growth is favoured by the increase in chain mobility.

The present inventors have found that a PLA composition with at least 1% by weight of dipentaerythritol markedly increases fluidity of the molten composition, as shown by the Melt Flow Index (MFI) test that it is well known to those skilled in this art, with respect to that of the original PLA alone without decreasing the glass transition temperature.

Therefore, dipentaerythritol can act both as a nucleating agent and as an accelerant by decreasing the viscosity of the molten composition. This fact also implies that the articles moulded with a PLA composition comprising dipentaerythritol will have sufficient rigidity once solidified at lower transformation temperatures to be taken out the mould without deforming.

Therefore, another aspect of the invention is the use of dipentaerythritol as a nucleating agent for polymers comprising poly(lactic acid). In an embodiment of this aspect, optionally in combination with any embodiments above or below, poly(lactic acid) has a molecular weight from 40 to 400 kg/mol measured by the GPC technique. Furthermore, in another embodiment of this aspect, the poly(lactic acid) comprised in the polymer is a mixture in any proportion of the polymers poly(L-lactic acid) and poly(D-lactic acid). In a further embodiment, optionally in combination with any embodiments above or below, dipentaerythritol is used as a nucleating agent for polymers further comprising PC.

In another embodiment of the invention, optionally in combination with any embodiments above or below, the invention relates to the use of dipentaerythritol as a nucleating agent for a polymer or polymer matrix comprising poly(lactic acid), wherein the weight ratio of poly(lactic acid) and dipentaerythritol is from 30:1 to 199:1, more particularly from 44:1 to 100:1.

The term "nucleating agent" in this field refers to a compound that promotes the crystallization of semi-crystalline polymers. Nucleating agents make the crystallization process more thermodynamically favourable by presenting a heterogeneous surface to the molten polymer. Thus, its action induces an increase in the crystallization temperature (Tc) of the polymer, which can be measured by means of DSC under dynamic heating or cooling conditions. Its action also induces a decrease in the crystallization half-time under isothermal conditions as measured by means of DSC.

Furthermore, the present invention also relates to a method of transforming the composition, producing articles with high deformation temperature under load, as measured by tests like Heat Deflection Temperature (HDT) or Vicat Softening Temperature, without affecting its dimensional stability. As shown in Example 6 and 7, the composition of the invention exhibits high crystallization rate even at low mould temperatures, i.e. the cycle time of production of the composition described herein is short; hence, making the use of these PLA compositions more commercially attractive. Thus, another aspect of the invention is a process to manufacture a moulded article, comprising the steps of:

a) heating the composition as defined in the first aspect at a temperature from 180 to 220° C.; and in all cases this temperature is limited to be below the melting temperature of the nucleating agent as defined above or below;

b) adding the composition obtained in step a) to a mould;

c) cooling the composition inside the mould; and d) taking the moulded article out of the mould;

wherein steps a) and b) can be carried out in any order.

As described in the Examples, melt blending of the composition can be performed by means of different protocols and using different tools. Examples of that include but are not limited to the exemplified below, the internal mixing chamber and the continuous co-rotating twin-screw extruder. Therefore, in an embodiment of this aspect, preparation of the compositions is performed by means of an internal mixing chamber, or, alternatively, by means of a continuous mixing screw extruder.

The present inventors have found that the material taken out of the mould has superior thermal stability when the poly(lactic acid) used has a superior purity (>99.5%) due to its greater facility to crystallize during the process of transformation by moulding.

In addition, they have pointed out that the composition of the invention can be taken out of the mould at a mould temperature of 80° C. and cooling times of at least 50 seconds. These nucleating agents, therefore, extend the working window during the moulding process, which is clearly advantageous with regard to other nucleating agents for PLA, such as LAK-301® (Takemoto Oil), poly(D-lactic acid) or talc.

According to results depicted in Example 6, a plastic article is obtainable from the composition of the invention, which has improved thermal stability, if the material is transformed at mould temperatures ranging from 70 to 120° C. Therefore, in a particular embodiment of this aspect, the mould temperature is from 70 to 120° C. More particularly from 70 to 95° C.; and even more particularly from 80 to 90° C. When the mould is cooled at temperatures below 90° C., water is the most common and preferred cooling fluid used in the field of injection moulding of plastics because water cooling systems are cleaner, safer and easier to manage compared with any others. When the mould is cooled at temperatures above 90° C. then other cooling fluids have to be used, choosing typically between pressurized water and a thermal oil. Therefore, any PLA composition that could be taken out of the mould at temperatures below 90° C. will offer a clear advantage for facilities manufacturing articles by injection moulding that commonly use water as a cooling fluid, compared with the PLA compositions that need to be taken out at temperatures above 90° C. requiring cooling fluids different from water at atmospheric pressure.

The compositions of the invention crystallize sufficiently fast in the mould to be able to take the plastic article out of the mould using reasonable mould temperatures and cycle times for industrial application.

The "cycle time" is the time necessary to produce an article made of plastic, that is, to heat the composition, add it in the mould, let it cool inside the mould, open and take the moulded article or part out of the mould and, finally, close the mould again. The transformation of an article of the composition of the invention requires a certain time.

Therefore, an embodiment of the aspect referring to the process for preparation of a moulded article, optionally in combination with any embodiments above or below, the cycle time is from 30 to 150 seconds, preferably from 40 to 90 seconds, or even more preferably from 50 to 80.

It is known that working at high mould temperatures promotes an increase of the thermal stability and the Heat Deflection Temperature (HDT) of the moulded plastic article made of PLA. It has been proved that, even with a similar crystalline content, the composition taken out of the mould at higher temperatures will have a higher thermal stability or HDT than the composition taken out at lower temperatures. Moreover, overheating, usually known as annealing in this art, of a moulded part made of a composition based on PLA when is out of the mould helps to crystallize the PLA completely.

This process is routinely performed in the plastic industry and could also be applied to the composition of the invention to further improve its properties. Therefore, in another embodiment of the invention, the moulded article is subsequently reheated to subject it to an annealing treatment at a temperature from 70° C. to 150° C. More particularly, the annealing temperature is from 100° C. to 120° C.

Finally, in yet another aspect, the invention provides an injection moulded article made from the composition as defined in any of the preceding aspects.

Throughout the description and claims the word "comprise" and variations of the word, are not intended to exclude other technical features, additives, components, or steps. Furthermore, the word "comprise" encompasses the case of "consisting of". Additional objects, advantages and features of the invention will become apparent to those skilled in the art upon examination of the description or may be learned by practice of the invention. The following examples are provided by way of illustration, and they are not intended to be limiting of the present invention. Furthermore, the present invention covers all possible combinations of particular embodiments described herein.

EXAMPLES

Reagents and General Protocols

The PLA ErcrosBio® LL650 (PLLA) supplied by Ercros S.A. was used for all the examples given below. It has a purity higher than 99.5% and an average molecular weight of 110 kg·mol$^{-1}$ as determined by GPC against a poly (methyl methacrylate) (PMMA) standard. Its glass transition temperature (Tg) and melting temperature (Tm) are about 55 and 178° C. respectively.

Pentaerythritol and dipentaerythritol used in these examples were supplied by Ercros S.A.

The mixture of pentaerythritol and its oligomers specifically containing dipentaerythritol (MPO) used in these examples consisted in a mixture of 47% by weight of dipentaerythritol, 12.5% by weight of pentaerythritol, 32% by weight of tripentaerythritol, and 8.3% by weight of a fraction containing tetrapentaerythritol, penta- and hexapentaerythritol.

The polycarbonate Makrolon® 2207 (PC) used in Example 5 was supplied by Bayer S.A. Its glass transition temperature is 144° C. and its Melt Flow Index (MFI) is 36 grams (10 minutes at 300° C. under a load of 2.16 kilograms).

Steamic® Talc is a talc supplied by Imerys Talc. It was used as a reference nucleating agent for poly(lactic acid). The PEG (with an average molecular weight of 6000 g·mol$^{-}$1), used as an example of plasticizer, and Biostrength® 150, used as an example of impact modifier, were supplied by Fluka and Arkema respectively. LAK301®, another nucleating agent, was supplied by Takemoto Oil & Fat Co. PLA ErcrosBio® LD550 (PDLA) and PLA ErcrosBio® LD600 (PDLA) were supplied by Ercros S.A. and were also used as a nucleating agents for poly(L-lactic acid). Joncryl® ADR-4300F (Joncryl) was supplied by BASF Chemical Company S.A. and was used as a compatibilizer agent between PLA and PC.

In all examples, PLA and PC pellets and the additives used were dried for 8 hours at 80° C. before starting the preparation of the compositions tested herein, except for the PEG, which was dried at 30° C. under vacuum for 24 hours.

Two different process were used to prepare the compositions to obtain the experimental data of the Examples: the internal mixing chamber and the mixing co-rotating twin extruder, both for melt blending. However, as commented in the detailed section, compositions of the inventions can be prepared by several procedures.

In examples 1 to 5, non-moulding characteristics of the different compositions were tested. In these cases, the internal mixing chamber process was used. Briefly, PLA ErcrosBio® LL650 was melt blended with different nucleating agents, plasticizers, accelerants, fillers and impact modifiers, at the indicated weight percentages, using an internal mixer (Plasticorder EC, Brabender GmbH & Co.) equipped with a 30 cm³ chamber and two counter rotating blades and using a wall temperature of 190° C. The PLA pellets (and PC pellets in example 5) and the additives were loaded into the chamber and mixed for 8 minutes at 60 rpm under nitrogen environment.

Crystallization peak temperature ($T_c$), degree of crystallinity of the PLA ($X_c$) and crystallization peak width ($\Delta T_c$) obtained during the cooling step of the resulting compositions were analysed by Differential Scanning calorimetry (DSC). A dynamic cooling scan was applied on a Differential Scanning calorimeter Perkin-Elmer DSC 6 Thermal Analysis System, to evaluate the nucleation and crystallization process of each PLA composition. Two cooling rates were set, 10 and 25° C./min, from 200 to 30° C., and $T_c$, $X_c$, and $\Delta T_c$ were determined in each case.

In Examples 6 and 7, injection moulded articles prepared with the different compositions specified below were tested. These compositions were manufactured by the following mixing protocol in a twin-screw extruder.

For the preparation of the composition of PLA with 1% of dipentaerythritol used in these examples, a masterbatch was prepared first. This masterbatch was prepared by melt blending the PLA resin with dipentaerythritol at a 95:5 weight ratio in a Brabender DSE 20/40 co-rotating twin screw extruder (diameter=20 mm, Length/Diameter ratio=40). A progressively increasing temperature ramp from 185° C. (hopper) to 200° C. (die) was set for extrusion using a screw rotation speed of 300 rpm and the obtained masterbatch was pelletized. The final composition was then prepared by adding the PLA resin (in the amount necessary to obtain the desired weight percentage in the final composition) and the masterbatch pellets to the feed hopper of the same extruder Brabender DSE 20/40 and mixed at the same conditions of temperature and rotation speed than when the masterbatch was prepared.

In the case of the comparative compositions of PLA with 5% by weight of talc and PLA with 5% by weight of PDLA, they were prepared directly using the same Brabender DSE 20/40 and at the same conditions of temperature and rotation speed mentioned above.

All injection moulding tests of the compositions were made using a Sumitomo IntElect 100/470-340 machine with the following specifications: clamping force: 1000 kN; distance between tie bars: 470×420 mm; overall size platens (H×V): 620×620 mm; injection volume: 113 cm³; screw diameter: 30 mm. 6-8 g bars of each of the compositions were obtained.

In example 7, the properties of the moulded article obtained using each composition specified below were measured. Glass transition temperature ($T_g$), the cold crystallization enthalpy, and the enthalpy and temperature of fusion of several PLA compositions were evaluated according to ISO 11357 by means of a heating scan on TA Instruments Q100 DSC, from 30 to 200° C. at 10° C./min. The degree of crystallinity of the bar of each PLA composition was calculated using the enthalpies involved during the heating scan. Heat deflection temperature at 1.80 MPa (HDT-A) was measured according to ISO 75. Charpy impact strength, with notched specimens, 4 mm thickness, elastic modulus, 1 mm/min, stress at break, 5 mm/min and elongation at break, 5 mm/min, were assessed according to ISO 527. Finally, melt flow index (MFI) was analysed according to ISO 1133 at 190° C.

Wide-angle X-ray scattering (WAXS) spectra were recorded on a Bruker AXS D8 Advance system with Cu Kα radiation of wavelength λ=1.5406 Å. A range of 2θ from 10° to 30° was recorded by a step size of 0.02° per second. Samples were prepared by melting them at 200° C. between cover slips in a Linkam hot-stage. As a result, consistent films were obtained after cooling the samples at 10° C./min until room temperature. The resulting films were used for the WAXS essay. The X-ray diffractogram shows the X-ray diffraction pattern (intensity (counts) vs. 2-theta angle))(°.

Example 1

In this example four samples of neat PLA were melt blended with 1% by weight of dipentaerythritol, with 1% by weight of pentaerythritol, with 5% by weight of talc or with 5% by weight of PDLA, respectively, and were analysed by means of the dynamic DSC method described above. The results were also compared with the results obtained with neat PLA. Table 1 shows the crystallization results extracted from the DSC curves. The composition containing dipentaerythritol showed higher crystallization peak temperature ($T_c$) and higher degree of crystallinity ($X_c$) during the cooling scan at 10 and 25° C./min on DSC in comparison with the neat PLA and the composition containing 5% by weight of talc. On the other hand, the composition containing dipentaerythritol showed similar crystallization peak temperature ($T_c$) and higher degree of crystallinity ($X_c$) during the cooling scan at 10° C./min on DSC in comparison with the composition containing 5% by weight of PDLA. When the cooling scan was performed at 25° C./min, the composition containing dipentaerythritol performed significantly higher crystallization peak temperature ($T_c$) and higher degree of crystallinity ($X_c$) in comparison with the composition containing 5% by weight of PDLA. Therefore, this data revealed that dipentaerythritol acts as a nucleating agent, and even more remarkably revealed that its efficiency as a nucleating agent is higher than talc, a well-known nucleating agent. Furthermore, the composition comprising 1% of pentaerythritol by weight did not show significant differences regarding crystallization dynamics comparing to neat PLA, indicating that the nucleating capacity is specific for dipentaerythritol.

TABLE 1

Crystallization results extracted from the cooling scan (10 y 25° C./min) on the DSC curves comparing neat PLA and PLA mixed with talc, PDLA, pentaerythritol and dipentaerythritol as nucleating agents.

| Compound/Property | Neat PLA (Comparative sample 01) | PLA with talc 5% (Comparative sample 02) | PLA with PDLA 5% (Comparative sample 03) | PLA with Dipentaerythritol 1% (Sample 04) | PLA with Pentaerythritol 1% (Comparative sample 05) |
|---|---|---|---|---|---|
| PLA ErcrosBio ® LL650 (% by weight) | 100 | 95 | 95 | 99 | 99 |

TABLE 1-continued

Crystallization results extracted from the cooling scan (10 y 25° C./min) on the DSC curves comparing neat PLA and PLA mixed with talc, PDLA, pentaerythritol and dipentaerythritol as nucleating agents.

| Compound/Property | Neat PLA (Comparative sample 01) | PLA with talc 5% (Comparative sample 02) | PLA with PDLA 5% (Comparative sample 03) | PLA with Dipentaerythritol 1% (Sample 04) | PLA with Pentaerythritol 1% (Comparative sample 05) |
|---|---|---|---|---|---|
| Steamic Talc ® (% by weight) | 0 | 5 | 0 | 0 | 0 |
| PLA ErcrosBio ® LD550 (% by weight) | 0 | 0 | 5 | 0 | 0 |
| Dipentaerythritol (% by weight) | 0 | 0 | 0 | 1 | 0 |
| Pentaerythritol (% by weight) | 0 | 0 | 0 | 0 | 1 |
| $T_C$ (10° C./min) (° C.) | 96.9 | 113.4 | 124.1 | 123.8 | 96 |
| $X_C$ (10° C./min) (%) | 17.2 | 36.9 | 39.7 | 47.1 | 26 |
| $T_C$ (25° C./min) (° C.) | No crystallization peak detected | 103.3 | 102.5 | 110.9 | 84 |
| $X_C$ (25° C./min) (%) | No crystallization peak detected | 26.5 | 25.4 | 34.2 | 1.5 |

Example 2

Tables 2 shows the crystallization results from the cooling scans at 10 and 25° C./min on DSC of compositions that consisted of PLA melt blended with dipentaerythritol loaded at different weight percentages (1, 3, 5, 10 and 15% by weight of total composition weight) and different average particle sizes of dipentaerythritol (7 µm, referred herein to as DPS; 24 µm, referred herein to as DPM; and 74 µm, referred herein to as DPL.

In general, the crystallization peak temperature ($T_c$) decreased by increasing the content of dipentaerythritol, particularly when the lowest average particle size was used (DPS), irrespective of the cooling rate. When the higher cooling rate was applied, i.e. 25° C./min, $T_c$ shifted to lower temperatures and the degree of crystallinity of PLA decreased comparing to the 10° C. cooling rate.

Regarding the degree of crystallinity of the PLA obtained during the cooling step ($X_c$), it was almost maintained throughout the compositions containing 3, 5 and 10% by weight of dipentaerythritol, irrespective of the cooling rate and the size of the particle. Although in the compositions containing 15% of dipentaerythritol the $X_c$ decreased, it remained significantly increased comparing to neat PLA composition values (See Table 1, Comparative sample 01).

TABLE 2

Crystallization results extracted from the cooling scan on the DSC curves (10° C. and 25° C./min) for different mass percentages of dipentaerythritol and different average particle sizes of dipentaerythritol.

| Sample | PLA ErcrosBio ® LL650 | DPS | DPM | DPL | $T_C$ (° C.) 10° C./min | $X_C$ (%) 10° C./min | $T_C$ (° C.) 25° C./min | $X_C$ (%) 25° C./min |
|---|---|---|---|---|---|---|---|---|
| Sample 04 | 99 | 1 | 0 | 0 | 123.8 | 47.1 | 110.9 | 34.2 |
| Sample 06 | 97 | 3 | 0 | 0 | 121.3 | 47.3 | 106.3 | 35.1 |
| Sample 07 | 95 | 5 | 0 | 0 | 117.9 | 43.6 | 104.3 | 31.7 |
| Sample 08 | 90 | 10 | 0 | 0 | 109.9 | 42.1 | 104 | 31.4 |
| Sample 09 | 85 | 15 | 0 | 0 | 109.4 | 37.2 | 101.3 | 24.1 |
| Sample 10 | 99 | 0 | 1 | 0 | 122.1 | 41.1 | 104.3 | 33.1 |
| Sample 11 | 97 | 0 | 3 | 0 | 121.6 | 45.6 | 110.8 | 31.5 |
| Sample 12 | 95 | 0 | 5 | 0 | 117.4 | 48.5 | 105.6 | 38.5 |
| Sample 13 | 90 | 0 | 10 | 0 | 119.9 | 46 | 102.3 | 36.7 |
| Sample 14 | 85 | 0 | 15 | 0 | 109.1 | 38 | 101.7 | 28.5 |
| Sample 15 | 99 | 0 | 0 | 1 | 120.7 | 40.5 | 101.9 | 30.2 |
| Sample 16 | 97 | 0 | 0 | 3 | 123.7 | 45.2 | 111.1 | 34.5 |
| Sample 17 | 95 | 0 | 0 | 5 | 119.3 | 43.7 | 104.8 | 31.5 |
| Sample 18 | 90 | 0 | 0 | 10 | 121.9 | 39.7 | 110.2 | 28.8 |
| Sample 19 | 85 | 0 | 0 | 15 | 120.4 | 35.9 | 107.2 | 21.6 |

The composition of the invention was further characterised by X-Ray analysis. FIG. 1 shows an example of the X-ray film diffractogram of composition comprising PLA and 5% of dipentaerythritol (Sample 07) by weight. As depicted in the FIGURE, there are three peaks at 16.99, 19.00 and 19.40±0.01 degrees 2 theta, corresponding 16.99 and 19.40 to PLA and 19.00 to the dipentaerythritol present in the composition.

Example 3

The potential impact of other additives currently used in the state of the art on the nucleating activity of dipentaerythritol was analysed. Compositions further comprising talc, PEG or Biostrength® 150 were tested using DSC.

Table 3 shows the crystallization results from the cooling scans at 10 and 25° C./min on DSC of the indicated compositions. The composition that consisted of PLA, 5% by weight of dipentaerythritol and 5% by weight of talc (Sample 20), performed higher crystallization peak temperature and lower degree of crystallinity comparing with the composition that consisted of PLA with the same percentage of dipentaerythritol without any other additive (Sample 07, Table 2). However, the crystallization peak of said composition was higher comparing to the composition, which consisted of PLA and 5% by weight of talc, in Comparative sample 02 (see Table 1). Therefore, the incorporation of dipentaerythritol into a composition comprising PLA and an inorganic filler such talc can improve the crystallization process of the biopolymer.

On the other hand, the composition that combined PLA and dipentaerythritol with Biostrength® 150, Sample 21, performed similar crystallization peak temperature and degree of crystallinity during the cooling scan on DSC compared with the composition that consisted of PLA with dipentaerythritol without any other additives (Sample 04 see Table 1 and 2). Therefore, the addition of the impact modifier into the PLA composition that contained dipentaerythritol did not affect the crystallization process of the PLA. Finally, the composition that consisted of PLA, dipentaerythritol and PEG, Sample 22, performed lower crystallization peak temperature and similar degree of crystallinity during the cooling scan on DSC compared with the composition that consisted of PLA with dipentaerythritol and without any other additives (Sample 04, see Table 1 and 2).

TABLE 3

Crystallization results extracted from the cooling scan on the DSC curves (10° C./min) for different combinations of dipentaerythritol with other additives.

| Compound/Property | Sample 20 | Sample 21 | Sample 22 |
|---|---|---|---|
| PLA ErcrosBio ® LL650 | 90 | 94 | 94 |
| Steamic ® Talc | 5 | 0 | 0 |
| PEG | 0 | 0 | 5 |
| Biostrength ® 150 | 0 | 5 | 0 |
| Dipentaerythritol (DPS) | 5 | 1 | 1 |
| $T_C$ (10° C./min) (° C.) | 119.3 | 122.5 | 118.5 |
| $X_C$ (10° C./min) (%) | 38.7 | 46.5 | 45.8 |

Example 4

Table 4 shows the crystallization results from the cooling scans at 10° C./min on DSC of compositions that consisted of PLA melt blended with different mass percentages of dipentaerythritol (1, 3, 5, 10 and 15% by weight) and PLA melt blended with different mass percentages of the mixture of MPO (1, 3, 5, 10 and 15% by weight).

In general, MPO enhanced the crystallization process of the PLA resin comparing with dipentaerythritol; compositions that contained MPO performed higher crystallization peak temperature, higher degree of crystallinity and a more narrow crystallization peak width, which denoted a more rapid crystallization process, developed during the cooling scan, comparing with the compositions that contained dipentaerythritol. Furthermore, there was almost no difference in the crystallization process of PLA when increasing the additive load in the PLA resin.

Therefore, taking into account these results, the mixture of pentaerythritol and its oligomers specifically containing dipentaerythritol could be an even more efficient alternative to the compositions containing dipentaerythritol in order to shorten the cycle time and lower the mould temperature in manufacturing articles based on poly(lactic acid) by injection moulding.

TABLE 4

Crystallization results extracted from the cooling scan on the DSC curves (10° C./min) for different mass percentages of dipentaerythritol and a mixture of pentaerythritol and its oligomers specifically containing dipentaerythritol (MPO) as described above.

| Sample | PLA ErcrosBio ® LL650 | Dipentaerythritol (DPS) | MPO | $T_C$ (° C.) | $X_C$ (%) | $\Delta T_C$ (° C.) |
|---|---|---|---|---|---|---|
| Sample 04 | 99 | 1 | 0 | 123.8 | 47.1 | 14.7 |
| Sample 06 | 97 | 3 | 0 | 121.3 | 47.3 | 16.6 |
| Sample 07 | 95 | 5 | 0 | 117.9 | 43.6 | 16.6 |
| Sample 08 | 90 | 10 | 0 | 109.9 | 42.1 | 15.5 |
| Sample 09 | 85 | 15 | 0 | 109.4 | 37.2 | 12.9 |
| Sample 23 | 99 | 0 | 1 | 122.1 | 52.8 | 11.8 |
| Sample 24 | 97 | 0 | 3 | 125 | 48.9 | 10.6 |
| Sample 25 | 95 | 0 | 5 | 121.7 | 52.2 | 12.1 |
| Sample 26 | 90 | 0 | 10 | 124.6 | 49.4 | 10.8 |
| Sample 27 | 85 | 0 | 15 | 124.7 | 46.3 | 10.7 |

Example 5

The potential impact of other polymers than PLA, as can be for example PC, in the polymer matrix on the nucleating activity of MPO was analysed using DSC.

Table 5 shows the crystallization results from the cooling scans at 10° C./min on DSC of two compositions that consisted of PLA melt blended with PC at a ratio of PLA to PC of 60/40 and 0.3% by weight of Joncryl (Comparative sample 28) and PLA melt blended with PC at a ratio of PLA to PC of 60/40, 0.3% by weight of Joncryl and 1% by weight of MPO (Sample 29).

The composition containing MPO (Sample 29) showed higher crystallization peak temperature ($T_c$) and higher degree of crystallinity ($X_c$) during the cooling scan at 10° C./min on DSC in comparison with the composition without nucleating agent (Comparative sample 28). On the other hand, the same composition containing MPO (Sample 29) showed higher crystallization peak temperature ($T_c$) and slightly lower degree of crystallinity ($X_c$) during the cooling scan at 10° C./min on DSC in comparison with the composition with PLA and 1% by weight of MPO without PC in the polymer matrix (Sample 23 in Table 4).

TABLE 5

Crystallization results extracted from the cooling scan on the DSC curves (10° C./min) comparing PLA melt blended with PC at a ratio of PLA to PC of 60/40 and 0.3% by weight of Joncryl (Comparative sample 28) and PLA melt blended with PC at a ratio of PLA to PC of 60/40, 0.3% by weight of Joncryl and 1% by weight of MPO (Sample 29).

| Sample | PLA ErcrosBio ® LL650 | Polycarbonate (PC) | Joncryl | MPO | $T_C$ (° C.) | $X_C$ (%) |
|---|---|---|---|---|---|---|
| Comparative sample 28 | 59.8 | 39.9 | 0.3 | 0 | 103.5 | 32.5 |
| Sample 29 | 59.2 | 39.5 | 0.3 | 1 | 126.4 | 45.6 |

Example 6

PLA composition containing 1% by weight of dipentaerythritol as a nucleating agent, was compared with bars made of neat PLA, bars made of a composition that consist of 95% by weight of PLA and 5% by weight of talc, bars made of a composition that consist of 99% by weight of PLA and 1% by weight of LAK-301®, and bars made of a composition that consist of 95% by weight of PLA and 5% by weight of PDLA. In Table 6 the shortest cooling times to take injected bars made of different compositions based on PLA out of a mould without presenting deformation or stickiness are shown.

The composition that contained 99% by weight of PLA and 1% by weight of dipentaerythritol could be taken out of the mould at a shorter cooling time comparing with neat PLA (Comparative sample 01) and a composition that consisted of 95% by weight of PLA melt blended with 5% by weight of talc (Comparative sample 02); indicating that the composition that contained dipentaerythritol as a nucleating agent performed a more rapid crystallization process during the transformation of the material. Another important factor to mention is the mould temperature. While the composition that contained dipentaerythritol was moulded at 80° C., the bars made of neat PLA, PLA with talc or PLA with PDLA were moulded at 90° C. At lower mould temperatures the bars made of neat PLA, PLA with talc or PLA with PDLA could not be ejected without presenting deformation or stickiness, denoting that dipentaerythritol could induce the crystallization of the PLA more rapidly and at lower temperatures than other known nucleating agents.

On the other hand, some commercial nucleating agents can be more effective than dipentaerythritol according to the DSC dynamic test such as LAK-301® from Takemoto Oil. However, a composition that consisted of 99% by weight of PLA and 1% by weight of LAK-301 (Comparative sample 30 in Table 6) could not be taken out of the mould at a temperature lower than 90° C. without presenting deformation or stickiness. In contrast, the composition of PLA with dipentaerythritol could be taken out of the mould at 80° C. without presenting deformation or stickiness of the PLA bars.

As it was highlighted in the description, the mould could be cooled with water at atmospheric pressure, without presenting deformation or stickiness, when the PLA composition is taken out of the mould at temperatures below 90° C. On the contrary, if the mould needed to be cooled at temperatures above 90° C., then the cooling fluid must be pressurized water or a thermal oil. Moulds cooled with water at atmospheric pressure are the most commonly used in the field of plastics manufacturing by injection moulding. Moreover, these systems are cleaner, safer and easier to manage compared with the moulds that need pressurized water or a thermal oil as cooling fluids. Therefore, dipentaerythritol could be a clear and more efficient alternative to commercial nucleating agents for PLA.

TABLE 6

Mould temperatures and minimum cooling times in injection moulding transformation

| Compound/Property | Neat PLA (Comparative sample 01) | PLA with talc 5% (Comparative sample 02) | PLA with PDLA 5% (Comparative sample 03) | PLA with Dipentaerythritol 1% (Sample 04) | PLA with LAK-301 1% (Comparative sample 30) |
|---|---|---|---|---|---|
| PLA ErcrosBio ® LL650 | 100 | 95 | 95 | 99 | 99 |
| Steamic ® Talc | 0 | 5 | 0 | 0 | 0 |
| PLA ErcrosBio ® LD600 | 0 | 0 | 5 | 0 | 0 |
| Dipentaerythritol (DPS) | 0 | 0 | 0 | 1 | 0 |
| LAK-301 ® | 0 | 0 | 0 | 0 | 1 |
| Mould temperature (° C.) | 90 | 90 | 95 | 80 | 90 |
| Shortest cooling time (s) | 200 | 60 | 60 | 50 | 26 |

Example 7

Table 7 shows the properties of the bars obtained by injection moulding according to the PLA compositions and conditions described above in Example 6. The composition that contained PLA and 1% by weight of dipentaerythritol performed similar HDT-A, elastic modulus and stress at break, lower elongation at break and impact strength and higher WI comparing with the other compositions tested. This data confirms that the addition of dipentaerythritol as a nucleating agent to a composition comprising PLA does not affect the mechanical properties that make this kind of plastics so attractive for industrial use.

TABLE 7

Properties of PLA bars as taken out of mould according to the Example 6.

| Compound/Property | Neat PLA (Comparative sample 01) | PLA with talc 5% (Comparative sample 02) | PLA with Dipentaerythritol 1% (Sample 04) |
|---|---|---|---|
| PLA ErcrosBio ® LL650 | 100 | 95 | 99 |
| Steamic ® Talc | 0 | 5 | 0 |
| Dipentaerythritol (DPS) | 0 | 0 | 1 |
| HDT-A (° C.) | 53.8 | 54 | 55.3 |

TABLE 7-continued

Properties of PLA bars as taken out of mould according to the Example 6.

| Compound/Property | Neat PLA (Comparative sample 01) | PLA with talc 5% (Comparative sample 02) | PLA with Dipentaerythritol 1% (Sample 04) |
|---|---|---|---|
| Notched Charpy Impact (KJ/m$^2$) | 7.9 | 4.9 | 3.3 |
| Stress at break (MPa) | 62 | 61 | 60 |
| Elongation at break (%) | 4.2 | 3.3 | 2.1 |
| Elastic modulus (MPa) | 3867 | 4928 | 3950 |
| MFI a 190° C. (g/10 min) | 9.7 | 7.0 | 13.8 |

CITATION LIST

EP2748256
EP3088467
Lin Z. et al, Polypropylene/Poly (Lactic Acid) Semibiocomposites Modified with Two Kinds of Intumescent Flame Retardants, Polymer-Plastics Technology and Engineering 2012, 51, 991-7.

For reasons of completeness, various aspects of the invention are set out in the following numbered clauses:

Clause 1. A composition comprising a polymer which comprises poly(lactic acid) and an additive which comprises dipentaerythritol, wherein the weight percentage of the polymer is from 80 to 99.5%, and the weight percentage of the additive is from 0.5 to 20%, wherein the % are expressed with respect to the total composition weight, provided that the sum of the amounts of the components is equal to 100%.

Clause 2. The composition according to clause 1, wherein the poly(lactic acid) is selected from poly(L-lactic acid), poly(D-lactic acid), poly(D,L-lactic acid), and combinations thereof.

Clause 3. The composition according to clause 2, wherein the poly(lactic acid) is selected from poly(L-lactic acid), poly(D-lactic acid), and combinations thereof.

Clause 4. The composition according to any of the preceding clauses, wherein the number molecular weight ($M_n$) of the poly(lactic acid) is from 40 to 400 kg/mol.

Clause 5. The composition according to any of the preceding clauses, wherein the crystallization temperature of the composition is 105° C. or higher measured by Differential Scanning calorimetry (DSC) when applying a controlled cooling ramp of 10° C./min.

Clause 6. The composition according to any of the preceding clauses, wherein the crystallization temperature of the composition is 99° C. or higher measured by Differential Scanning calorimetry (DSC) when applying a controlled cooling ramp of 25° C./min.

Clause 7. The composition according to any of the preceding clauses, wherein the degree of crystallinity ($X_c$) of the composition is from 35 to 55 measured by Differential Scanning calorimetry (DSC) when applying a controlled cooling ramp of 10° C./min.

Clause 8. The composition according to any of the preceding clauses, wherein the degree of crystallinity (Xc) of the composition is from 21 to 45 measured by Differential Scanning calorimetry (DSC) when applying a controlled cooling ramp of 25° C./min.

Clause 9. The composition according to any of the preceding clauses, wherein the weight percentage of the additive is from 0.5 to 15%, more particularly from 1 to 5%.

Clause 10. The composition according to any of the preceding clauses, wherein the additive is in the form of particles having a mean particle size from 5 to 90 μm.

Clause 11. The composition according to any of the preceding clauses, wherein the additive consists of dipentaerythritol.

Clause 12. The composition according to any of the clauses 1-10, wherein the additive further comprises one or more compounds selected from the group consisting of pentaerythritol, tripentaerythritol, tetrapentaerythritol, pentapentaerythritol and hexapentaerythritol.

Clause 13. The composition according to clause 12, wherein the additive is present in the composition in the form of particles, more particularly particles having a mean particle size from 1 to 80 μm.

Clause 14. The composition according to clause 12, wherein the additive comprises pentaerythritol, dipentaerythritol, tripentaerythritol, tetrapentaerythritol, pentapentaerythritol and hexapentaerythritol; and wherein the weight percentage of dipentaerythritol is from 40 to 50%, the weight percentage of pentaerythritol is from 1 to 20%, the weight percentage of tripentaerythritol is from 30 to 40%, and the weight percentage of the fraction containing tetra-penta- and hexapentaerythritol, wherein the amount of penta- and hexapentaerythritol is equal or lower than 50% by weight with respect to the fraction, is from 5 to 20%, wherein the % are expressed with respect to the total additive weight, provided that the sum of the amounts of the components of the additive is equal to 100%.

Clause 15. The composition according to clause 12, wherein the additive consists of pentaerythritol, dipentaerythritol, tripentaerythritol, tetrapentaerythritol, pentapentaerythritol and hexapentaerythritol; and wherein the weight percentage of dipentaerythritol is from 40 to 50%, the weight percentage of pentaerythritol is from 1 to 20%, the weight percentage of tripentaerythritol is from 30 to 40%, and the weight percentage of the fraction containing tetra-penta- and hexapentaerythritol, wherein the amount of penta- and hexapentaerythritol is equal or lower than 50% by weight with respect to the fraction, is from 5 to 20%, wherein the % are expressed with respect to the total additive weight, provided that the sum of the amounts of the components of the additive is equal to 100%.

Clause 16. The composition according to any of the preceding clauses, wherein the composition further comprises one or more compounds selected from the group consisting of fillers, plasticizers, impact modifiers, accelerating agents, nucleating agents and combinations thereof.

Clause 17. The composition according to clause 15, wherein the one or more compounds are present in the composition in an amount from 1 to 19.5%, more particularly from 2 to 10%, by weight with respect to the total composition weight.

Clause 18. The composition according to any of the preceding clauses, wherein the weight percentage of the polymer is from 85 to 99.5%, more particularly from 95 to 99%, by weight with respect to the total composition weight.

Clause 19. The composition according to any of the preceding clauses, wherein the polymer consists of poly (lactic acid).

Clause 20. The composition according to any of the clauses 1-18, wherein the polymer of the invention further comprises another thermoplastic, preferably selected from the group consisting of polycarbonate (PC), poly(acrylonitrile butadiene styrene) (ABS), poly(butylene succinate) (PBS) and poly(hydroxyalcanoates) (PHA).

Clause 21. The composition according to any of the clauses 1-18, wherein the composition consists of a polymer which comprises poly (lactic acid) and an additive which comprises dipentaerythritol.

Clause 22. The composition according to clause 21, wherein the polymer consists of poly(lactic acid) and an additive which consists of dipentaerythritol.

Clause 23. The composition according to any of the preceding clauses; wherein the composition is obtainable by a process comprising blending the polymer and the additive, wherein the polymer is in a fluid state.

Clause 24. Process for the preparation of the composition as defined in any of the clauses 1-23, comprising blending a polymer comprising poly(lactic acid) and an additive comprising dipentaerythritol, wherein the polymer is in a fluid state.

Clause 25. The process according to clause 24, wherein the polymer is in a fluid state comprises melt blending the polymer and the additive at a temperature from 180° C. to 220° C., more particularly, from 185 to 210° C. In Clause 26. The process according to any of the preceding clauses, wherein the step of blending the polymer and the additive comprises dissolving the polymer in the presence of the additive.

Clause 27. Use of dipentaerythritol as a nucleating agent for polymers comprising poly(lactic acid).

Clause 28. A process for the preparation of a moulded article, comprising the steps of:
  a) heating the composition as defined in any of the clauses 1-23 at a temperature from 180 to 220° C.
  b) adding the composition obtained in step a) to a mould;
  c) cooling the composition inside the mould; and
  d) taking out of the mould the moulded article;
  wherein steps a) and b) are carried out in any order.

Clause 29. An injection moulded article made from the composition as defined in any of the clauses 1-23.

The invention claimed is:

1. A composition comprising:
   a) a polymer which comprises poly(lactic acid), and
   b) an additive,
   wherein
   the weight percentage of poly(lactic acid) in the polymer is from 60 to 100%,
   the weight percentage of the polymer is from 80 to 99.5%, and
   the weight percentage of the additive is from 0.5 to 20%,
   wherein the weight percentages of the polymer and additive are expressed with respect to the total composition weight, provided that the total sum of the amount of all components in the composition is equal to 100%,
   wherein the additive comprises pentaerythritol, dipentaerythritol, tripentaerythritol, tetrapentaerythritol, pentapentaerythritol, and hexapentaerythritol;
   wherein
   the weight percentage of dipentaerythritol is from 40 to 50%,
   the weight percentage of pentaerythritol is from 1 to 20%,
   the weight percentage of tripentaerythritol is from 30 to 40%, and
   the weight percentage of the sum of tetra-, penta-, and hexapentaerythritol is from 5 to 20%, wherein the amount of penta- and
   hexapentaerythritol is equal to or less than 50% by weight with respect to the sum of tetra-, penta-, and hexapentaerythritol,
   wherein the weight percentages are expressed with respect to the total additive weight, provided that the total sum of the amount of the additive in the composition is equal to 100%.

2. An injection moulded article made from the composition as defined in claim 1.

* * * * *